Dec. 10, 1940.  E. W. KRUEGER  2,224,306
SHOCK ABSORBING DEVICE
Filed Nov. 2, 1939
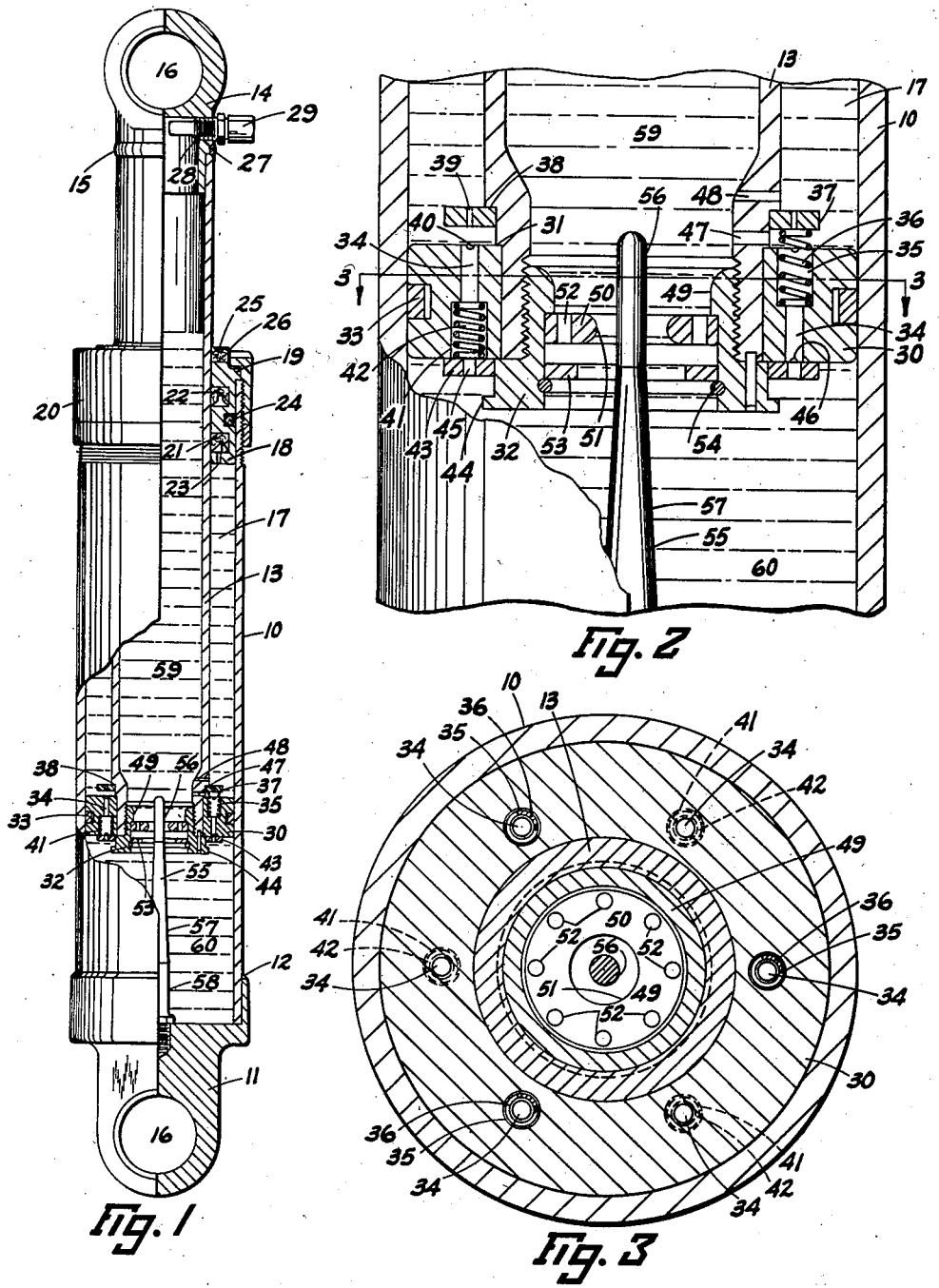
INVENTOR
ELMER W. KRUEGER
BY
ATTORNEY Patented Dec. 10, 1940

2,224,306

UNITED STATES PATENT OFFICE 2,224,306

SHOCK ABSORBING DEVICE

Elmer W. Krueger, Cleveland, Ohio, assignor to The Cleveland Pneumatic Tool Company, Cleveland, Ohio, a corporation of Ohio Application November 2, 1939, Serial No. 302,527

3 Claims. (Cl. 267—64)

This invention relates broadly to shock absorbing devices useful in the arts generally, and more particularly for use on automobiles to prevent excessive movement of the vehicle body relative to the axle.

One object of this invention is the provision of a shock absorber adapted for use on automobiles and the like, which will efficiently cushion undue movements of the vehicle body relative to the axle.

Another object of this invention is to produce a hydropneumatic shock absorber constructed and arranged in a manner whereby the road shocks to which the vehicle may be subjected will be cushioned or absorbed pneumatically and the rebound movements will be checked hydraulically, thereby producing an efficient shock absorbing device particularly adapted for use with automobiles, trucks and the like.

Another object of this invention is the production of a shock absorber including hydraulic fluid conveying passages controlled by adequate valve means enabling free flow of the fluid during normal rebound movement of the vehicle body relative to the axle, but capable of checking the flow of the fluid through the passages during abnormal conditions of operation, thereby resulting in a shock absorber which will materially increase the riding qualities of the vehicle.

Other objects and advantages more or less ancillary to the foregoing reside in the specific construction and aggroupment of the elements peculiar to this structure, as will become apparent from a more complete examination of this specification.

In the drawing:

Fig. 1 is a side elevational view partly in section of a shock absorber embodying the invention.

Fig. 2 is an enlarged fragmentary view in section of the shock absorber shown in Fig. 1.

Fig. 3 is a cross sectional view taken in a plane indicated by line 3—3 in Fig. 1.

Referring to the drawing, 10 designates an outer cylinder closed at its outer end by a head 11 secured thereto by any suitable means such as a weld 12. Slidably mounted within the outer cylinder 10, there is an inner cylinder 13 closed at its outer end by a head 14 secured thereto by a weld 15. The heads 11 and 14 are both apertured as at 16 for attachment of the cylinders to the parts of a vehicle whose movements are to be cushioned, preferably the head 11 being secured to the axle while the head 14 is affixed to the body. The diameter of the inner cylinder 13 is materially smaller than that of the outer cylinder 10, thus resulting in a compartment 17 formed between the two cylinders, which compartment is closed at its upper end by a bushing 18 having an external annular flange 19 resting on the inner end of the cylinder 10 and secured in position by a retaining nut 20 screwed on the cylinder 10. The bushing 18 fits closely between the two cylinders and acts as a sliding bearing therebetween, it being made preferably of good bearing material such as bronze or the like. Intermediate its ends, the bushing 20 carries longitudinally spaced packing rings 21 and 22 affording a fluid tight joint between the bushing and the inner cylinder, the packing ring 21 being connected with the compartment 17 through a small port 23. To prevent possible leakage of fluid between the bushing 18 of the outer cylinder 10, the former also carries a packing ring 24 in fluid tight engagement with the inner wall of the cylinder 10. On the bushing 18 is also mounted a wiper 25 active on the inner cylinder and held in place by a retainer 26 clamped between the flange 19 and the retaining nut 20. The head 14 of the inner cylinder 13 is provided with a laterally extending screw threaded bore 27 having mounted therein a filler plug 28 and an air valve 29.

Mounted on the inner end of the inner cylinder 13, there is a piston 30 engaging an annular shoulder 31 formed on the inner cylinder near the inner end thereof and secured in position by a cap 32 screwed within the inner end portion of the inner cylinder, which piston slidably engages the inner wall of the cylinder 10 and carries a piston ring 33 affording a fluid tight joint therebetween. The piston 30 is provided with a plurality of passages 34 extending longitudinally therethrough. Some of the passages 34 have their ends opening into the compartment 17 counterbored as at 35 to accommodate small compression springs 36, which springs engage a ring valve 37 slidable on the inner cylinder 13 between the piston 30 and an external annular shoulder 38 formed on the cylinder 13 above the piston 30. This valve is also provided with one or more restricted ports 39 extending longitudinally therethrough and capable of registration with a small annular groove 40 formed on the upper end wall of the piston 30. Some of the other passages 34 have their lower end portion formed with a counterbore 41 accommodating compression springs 42 engaging a ring valve 43 slidable on the cap 32 between the lower side wall of the piston 30 and an annular flange 44 formed on the cap 32. The valve 43 is also provided with one or more small ports 45 extending longitudinally therethrough and capable of registration with a small annular groove 46 provided on the lower end wall of the piston 30. Extending through the wall of the cylinder 13 immediately above the piston 30, there are two longitudinally spaced ports 47 and 48, the port 47 being controlled by the valve 37, while the port 48 which is located above the port 47, is of a diameter somewhat smaller than that of the port 47.

The cap 32 is provided with a central bore 49 extending therethrough and having rigidly secured therein a diaphragm 50 formed with a central orifice 51, which diaphragm together with the bushing 32 form a part of the piston 30. Also extending longitudinally through the diaphragm 50, there is one or more passages 52 which may be closed by an annular valve 53 slidable within the bore 49 below the diaphragm 50, and having its downward movement limited by a spring clip 54 mounted within the bore 49. Carried by the head 11 of the outer cylinder 10, there is a metering pin 55 slidable through the annular valve 53 and the orifice 51 of the diaphragm 50. Toward its free end, the metering pin is formed with a small cylindrical portion 56, while the central portion of the pin gradually increases as at 57 to end in a cylindrical portion 58 of a diameter substantially equal to that of the orifice 51.

In addition to the annular chamber 17, the interior of the two cylinders forms a chamber 59 located above the diaphragm 50 and a chamber 60 located below the diaphragm.

In practice, before installation, the shock absorber is first fully extended and liquid, such as oil, is poured into the chamber 59 through the bore 27 by removing the plug 28. When the chambers 60 and 59 are completely filled with liquid, the shock absorber is then gradually compressed, causing the liquid to gradually fill the compartment 17 and resulting in the chamber 59 and compartment 17 to be completely filled with liquid when the shock absorber is finally fully compressed, the excessive amount of liquid having escaped through the bore 27. Subsequently, the filler plug 28 is again screwed into position and fluid such as compressed air admitted into the chamber 59 through the air valve 29, which compressed air will cause partial extension of the shock absorber, the installation being calculated to enable the piston 30 to be positioned substantially half way between the ends of its possible strokes during static condition, in which instance, the diaphragm 50 is located above the metering pin 55.

In the operation, while traveling over relatively smooth roads, small forces such as resulting from slight depression of the road bed, causing relatively slow telescopic movement of the two cylinders will not be sufficient to cause the fluid within the shock absorber to overcome the compression springs 36 and 42, thereby enabling during the compression of the two cylinders displacement of the liquid from the chamber 60 into the chamber 59 via the fully opened orifice 51 and into the compartment 17 through the fully opened piston passages 34, as well as through the ports 47 and 48. In this instance, the flow of the fluid is only checked by the action of the compressed air in the upper end of the chamber 59.

The recoil strokes normally resulting from prior compression strokes of the shock absorber as well as the expansion of the compressed air within the upper end of the chamber 59, will also result in the free flow of the liquid from the compartment 17 into the chamber 60 through the opened passages 34, and into the chamber 59 through the opened ports 48 and 47. Should, however, the vehicle be subjected to more noticeable shocks such as resulting from major depressions in the road bed, the sudden compression stroke of the cylinders will tend to cause a sudden displacement of the liquid from the chamber 60 into the compartment 17. The liquid now under additional pressure will act on the ring valve 43 to move it into engagement with the lower end of the piston 30 for closing the passages 34, and on the annular valve 53 for closing the passages 52. Thereafter displacement of the fluid will be forced to take place only through the orifice 51 of the diaphragm 50 and through the very restricted ports 45 of the valve 43, thereby causing, in addition to the pneumatic check resulting from the action of the compressed air within the upper end of the chamber 59, an additional restriction to the sudden compression stroke of the cylinders. In this instance, should the forces causing the compression stroke of the cylinders be of such an extent as to tend to completely compress the shock absorber, the metering pin 55 will, as the diaphragm 52 moves downwardly, enter the orifice 51 and gradually reduce the fluid conveying capacity of the orifice, to finally close the orifice when the straight portion 58 of the pin starts through the orifice, thereby permitting the liquid flow only through the ports 45 of the valve 43 into the compartment 17 and therefrom into the chamber 59 through the ports 47 and 48, and consequently preventing sudden impacts of the piston 30 or cap 32 on the head 11 of the cylinder 10.

During the sudden extension stroke of the shock absorber resulting from the rebound of the parts whose movements have been checked in one direction, the valve 37 will move into engagement with the upper end of the piston 30 for closing the port 47 and passages 34. In this instance, the motive fluid from the compartment 17 will flow into the chamber 60 through the restricted ports 39 of the valve 37 and into the chamber 59 through the ports 48, the combined area of the ports 39 and 48 being calculated to restrict the flow of the liquid in a manner resulting in an efficient hydraulic resistance against the extension of the two cylinders. During the recoil movement of the cylinders when in substantially complete compressed position, the liquid from the chamber 59 will be free to flow into the chamber 60 through the diaphragm ports 52 now opened by the valve 53, while the orifice 51 remains close by the metering pin's straight portion 58.

From the foregoing explanation, it will be understood that due to the valves 37 and 43 normally held open by the compression springs 36 and 42, small relative movement between the vehicle body and its axle can take place without being affected by the shock absorber. However, upon greater force causing this relative movement, the liquid acting on the valves 37 and 43 will overcome the compression springs 36 and 42 respectively for checking the flow of the fluid between the different chambers of the shock absorbers, thus resulting in checking relative movement between the vehicle body and its axle.

The valve 53 cooperating with the passages 52 of the diaphragm 50 also provides resistance to excessive compression shocks while enabling return flow of the liquid from the chamber 59 into the chamber 60 during the recoil movement of the two cylinders.

Although the foregoing description is necessarily of a detailed character, in order to completely set forth the invention, it is to be understood that the specific terminology is not intended to be restrictive or confining and it is to be further understood that various rearrangements of parts and modifications of structural detail may be resorted to without departing from the scope or spirit of the invention as herein claimed.

I claim:

1. A shock absorber comprising a pair of telescoping cylinders, a piston on the inner end of the inner cylinder, an orifice through said piston, compressible fluid and liquid stored within said cylinders the former subjected to compression upon displacement of the latter through said orifice during inward movement of said cylinders, a metering pin slidable through said orifice for gradually reducing the liquid conveying capacity thereof toward the end of said inward movement, a compartment between said cylinders having liquid stored therein, passages through said piston normally enabling displacement of the liquid between said cylinders and compartment, a valve on each side of said piston one for closing said passages during the compression stroke and the other during the extension stroke of said cylinders, and spring means maintaining said valves in open position during certain conditions of operation irrespective of the direction of the strokes of said cylinders but enabling movement of said valves into close position during other conditions of operation.

2. A shock absorber comprising a pair of telescoping cylinders having liquid stored therein, a piston on the inner end of the inner cylinder, a compartment between said cylinders above said piston having liquid stored therein, longitudinally spaced ports through the wall of the inner cylinder above said piston, passages through said piston, a valve within said compartment normally opened relative to said ports and passages, said valve during certain conditions of operation being movable into closed position relative to one of said ports and said passages for retarding the liquid flow from said compartment into said cylinders, and a second valve normally opened relative to said passages, said last valve during certain conditions of operation being movable into closed position relative to said passages for retarding the liquid flow from said cylinders below said piston into said compartment.

3. A shock absorber comprising a pair of telescoping cylinders, means including a piston on the inner end of the inner cylinder dividing said cylinders into upper and lower chambers, a compartment between said cylinders above said piston, liquid stored within said chambers and compartment, an orifice and a passageway affording communication between said chambers, a metering pin slidable through said orifice for gradually reducing the liquid conveying capacity thereof toward the end of the inward movement of said cylinders, a disk valve for closing said passageway during said inward movement, ports through said piston normally enabling displacement of the liquid between said lower chamber and compartment, a ring valve on each side of said piston one for closing said ports during the inward movement and the other during the outward movement of said cylinders, and spring means maintaining said ring valves in open position during certain conditions of operaton irrespective of the direction of movement of said cylinders but enabling movement of said ring valves into closed position during other conditions of operation.

ELMER W. KRUEGER.